(12) United States Patent
Kim et al.

(10) Patent No.: US 12,500,035 B2
(45) Date of Patent: Dec. 16, 2025

(54) MULTILAYER ELECTRONIC COMPONENT AND BOARD HAVING MULTILAYER ELECTRONIC COMPONENT MOUNTED THEREON

(71) Applicant: SAMSUNG ELECTRO-MECHANICS CO., LTD., Suwon-si (KR)

(72) Inventors: Hwi Dae Kim, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 103 days.

(21) Appl. No.: 18/526,389

(22) Filed: Dec. 1, 2023

(65) Prior Publication Data

US 2024/0282521 A1  Aug. 22, 2024

(30) Foreign Application Priority Data

Feb. 21, 2023 (KR) .......................... 10-2023-0022870

(51) Int. Cl.
*H01G 4/012* (2006.01)
*H01G 4/232* (2006.01)
*H01G 4/30* (2006.01)
*H05K 1/18* (2006.01)

(52) U.S. Cl.
CPC ............. *H01G 4/012* (2013.01); *H01G 4/232* (2013.01); *H01G 4/30* (2013.01); *H05K 1/181* (2013.01); *H05K 2201/10015* (2013.01)

(58) Field of Classification Search
CPC .......... H01G 4/012; H01G 4/30; H01G 4/306; H01G 4/1209; H01G 4/232; H01G 4/302; H05K 1/181; H05K 2201/10015
See application file for complete search history.

(56) References Cited

U.S. PATENT DOCUMENTS

| | | |
|---|---|---|
| 2015/0041199 A1 | 2/2015 | Lee et al. |
| 2016/0268044 A1* | 9/2016 | Gu ............................ H01G 4/12 |
| 2018/0350521 A1* | 12/2018 | Oh .......................... H01G 4/012 |
| 2019/0027312 A1* | 1/2019 | Muramatsu ............... H01G 4/12 |
| 2020/0234883 A1 | 7/2020 | Muramatsu |
| 2021/0043383 A1 | 2/2021 | Lee |
| 2021/0193390 A1* | 6/2021 | Chigira ................... H01G 4/012 |

(Continued)

FOREIGN PATENT DOCUMENTS

| | | |
|---|---|---|
| JP | 6309313 B2 | 4/2018 |
| JP | 2020-119993 A | 8/2020 |

(Continued)

*Primary Examiner* — Michael P Mcfadden

(74) *Attorney, Agent, or Firm* — Morgan, Lewis & Bockius LLP

(57) ABSTRACT

A multilayer electronic component includes a body including a dielectric layer and an internal electrode, and an external electrode disposed on the body. The internal electrode is connected to the external electrode through a lead-out portion. With respect to a cross-section of the internal electrode in the second and third directions, when an average length of the lead-out portion in contact with the external electrode is defined as "A" and an average length of the external electrode, connected to the lead-out portion, in contact with the body is defined as "B," "A/B" is 0.75 or less.

18 Claims, 10 Drawing Sheets

(56) References Cited

U.S. PATENT DOCUMENTS

2021/0202173 A1\* 7/2021 Fujita ..................... H01G 4/248
2023/0268132 A1\* 8/2023 Takei ................... H01G 4/1209
361/301.4

FOREIGN PATENT DOCUMENTS

KR 10-2019-0116148 A 10/2019
KR 10-2077617 B1 2/2020

\* cited by examiner

MULTILAYER ELECTRONIC COMPONENT AND BOARD HAVING MULTILAYER ELECTRONIC COMPONENT MOUNTED THEREON

CROSS-REFERENCE TO RELATED APPLICATION (S)

This application claims benefit of priority to Korean Patent Application No. 10-2023-0022870 filed on Feb. 21, 2023 in the Korean Intellectual Property Office, the disclosure of which is incorporated herein by reference in its entirety.

TECHNICAL FIELD

The present disclosure relates to a multilayer electronic component and a board having the same mounted thereon.

A multilayer ceramic capacitor (MLCC), a multilayer electronic component, is a chip-type condenser mounted on the printed circuit boards of various types of electronic products such as imaging devices, including a liquid crystal display (LCD) and a plasma display panel (PDP), computers, smartphones, and mobile phones, and serves to charge or discharge electricity therein or therefrom.

The multilayer ceramic capacitor may be used as a component of various electronic devices due to having a small size, ensuring high capacitance and being easily mounted. With the miniaturization and high-output power of various electronic devices such as computers and mobile devices, demand for miniaturization and implementation of high capacitance of multilayer ceramic capacitors has also been increasing.

MLCCs also have been widely used for decoupling that removes noise from electrical signals within a set due to excellent high-frequency (low ESL) properties thereof.

In order to address noise in high-speed integrated circuits (ICs), land surface capacitors (LSCs) may be applied to portions adjacent to the ICs. It is known that an LSC requires low thickness and high-frequency properties. In order to reduce ESL, it is important to minimize the number of magnetic flux linkages per unit current in a high frequency-region. Such an issue has been addressed in various manners, such as controlling the formation and structure in a way that minimizes a current loop, or disposing internal and external electrodes in a manner cancelling a magnetic field.

ESL properties may also be important. However, there is also a growing need to improve reliability for stable operation of MLCCs. When exposed to a humid environment, moisture may permeate into an MLCC and cause failure. One of the main moisture permeation pathways is known as a path through which moisture permeates into an internal electrode through an interface between an external electrode and a ceramic body. Accordingly, there is a need for research into an MLCC structure capable of achieving low ESL while improving moisture resistance reliability by suppressing the permeation of external moisture.

SUMMARY

An aspect of the present disclosure provides a multilayer electronic component having improved high-frequency (low ESL) properties.

Another aspect of the present disclosure provides a multilayer electronic component having improved moisture resistance reliability.

However, the aspects of the present disclosure are not limited to those set forth herein, and will be more easily understood in the course of describing specific example embodiments of the present disclosure.

According to an aspect of the present disclosure, there is provided a multilayer electronic component including a body including a dielectric layer and an internal electrode disposed alternately with the dielectric layer in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction, and an external electrode disposed on the body. The external electrode may include first to fourth external electrodes. The internal electrode may include a first internal electrode including a first lead-out portion through which the first internal electrode may be connected to the first external electrode, a second internal electrode including a second lead-out portion through which the second internal electrode may be connected to the second external electrode, a third internal electrode including a third lead-out portion through which the third internal electrode may be connected to the third external electrode, a fourth and internal electrode including a fourth lead-out portion through which the fourth internal electrode may be connected to the fourth external electrode. With respect to a cross-section of the internal electrode in the second and third directions, when an average length of the first, second, third or fourth lead-out portion in contact with the first, second, third or fourth external electrode, respectively, is defined as "A" and an average length of the first, second, third or fourth external electrode connected to the first, second, third or fourth lead-out portion, respectively, and in contact with the body is defined as "B," "A/B" may be 0.75 or less.

According to another aspect of the present disclosure, there is provided a board having a multilayer electronic component mounted thereon, the board including a printed circuit board including an electrode pad that may include first to fourth electrode pads, the multilayer electronic component installed on the printed circuit board, and a solder connecting the electrode pad and the multilayer electronic component to each other. The solder may include first to fourth solders. First to fourth external electrodes of the multilayer electronic component and the first to fourth electrode pads may be connected to each other by the first to fourth solders, respectively.

According to example embodiments of the present disclosure, a multilayer electronic component may have improved high-frequency (low ESL) properties.

According to example embodiments of the present disclosure, a multilayer electronic component may have improved moisture resistance reliability.

The various and beneficial advantages and effects of the present disclosure are not limited to those set forth herein, and will be more easily understood in the course of describing specific example embodiments.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
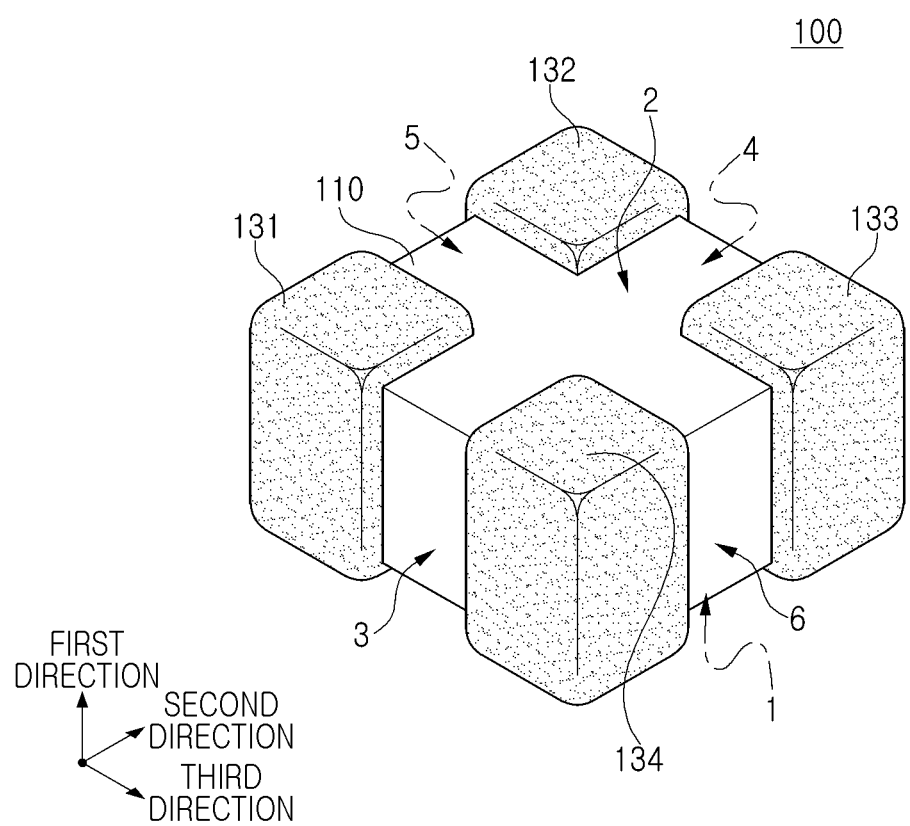
FIG. 1 is a schematic perspective view of a multilayer electronic component according to an example embodiment of the present disclosure.

Hereinafter, example embodiments of the present disclosure are described with reference to the accompanying drawings. The present disclosure may, however, be exemplified in many different forms and should not be construed being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a lamination direction or a thickness (T) direction, a second direction may be defined as a length (L) direction, and a third direction may be defined as a width (W) direction.

Multilayer Electronic Component

FIG. 1 is a schematic perspective view of a multilayer electronic component according to an example embodiment of the present disclosure.

Figure 2:
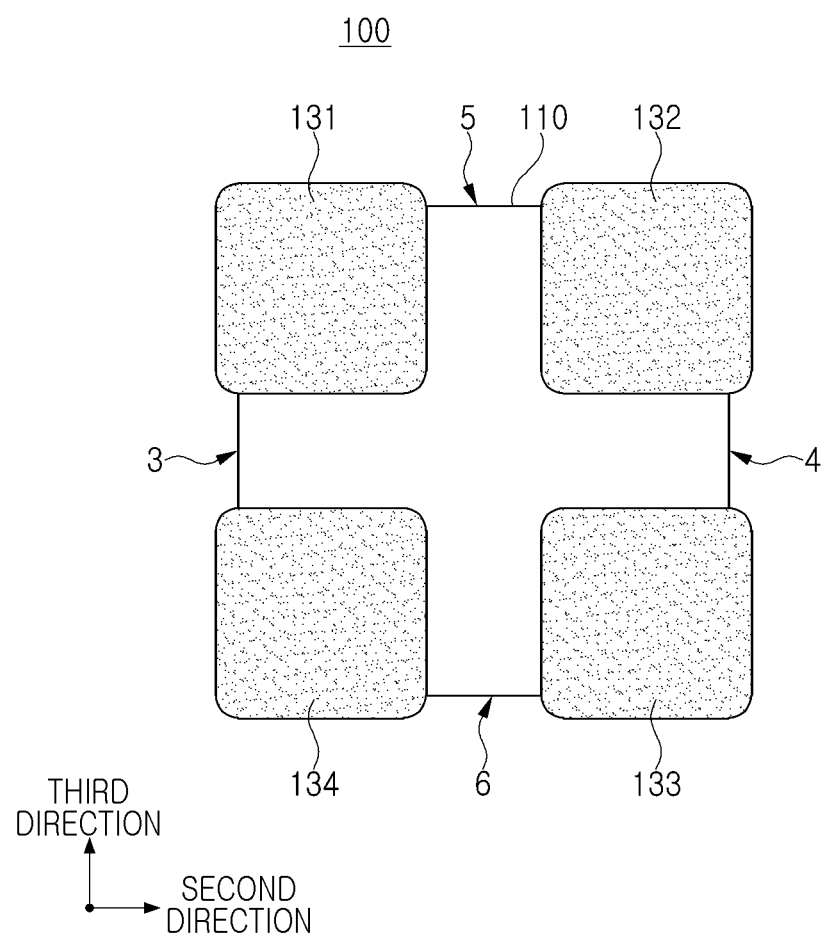
FIG. 2 is a schematic plan view of FIG. 1.

FIG. 2 is a schematic plan view of FIG. 1.

FIGS. 3A to 3D are schematic cross-sectional views of an internal electrode including a lead-out portion according to an example embodiment of the present disclosure.

Figure 3A:
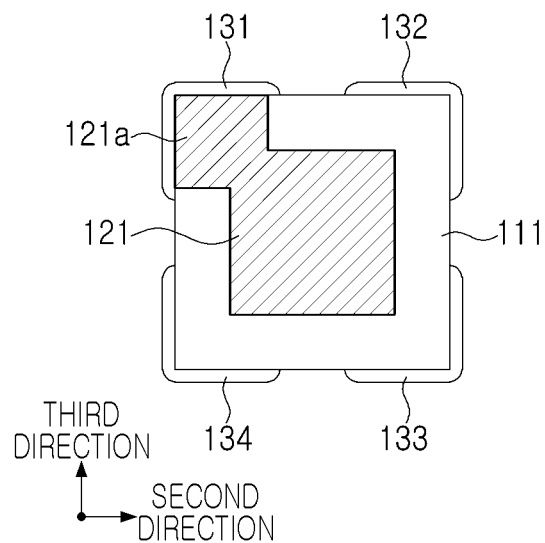
FIGS. 3A to 3D are schematic cross-sectional views of an internal electrode including a lead-out portion according to an example embodiment of the present disclosure.
Figure 3B:
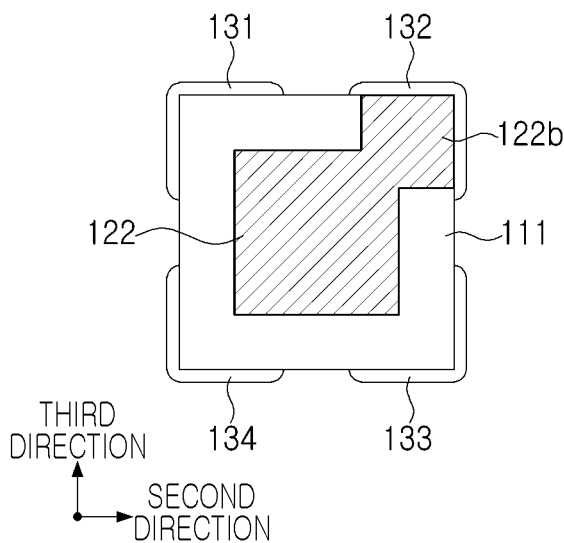
Figure 3C:
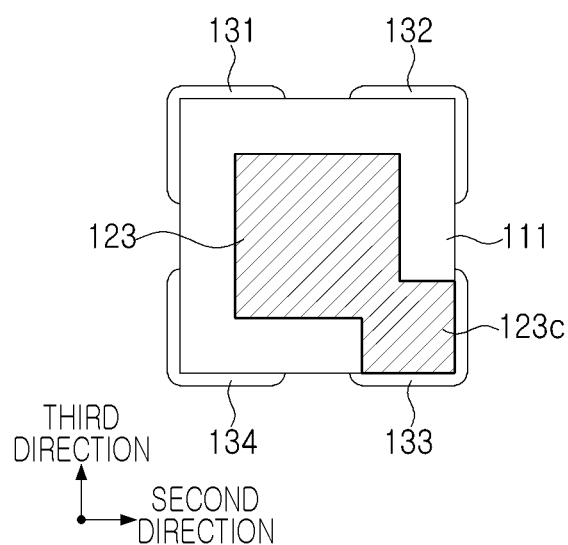
Figure 3D:
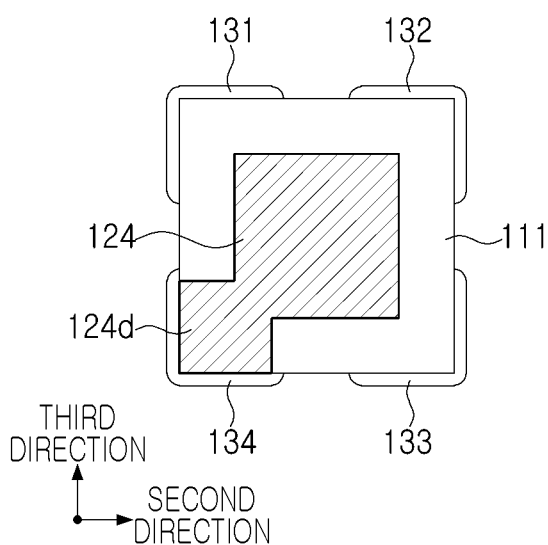
Figure 4:
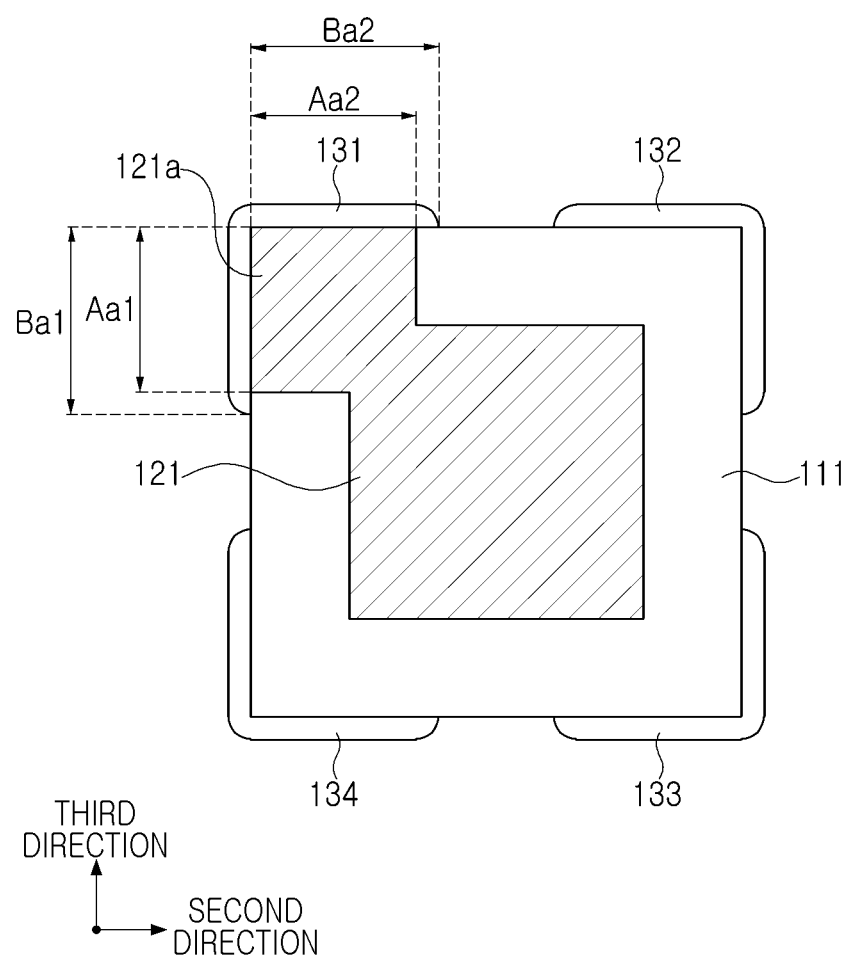
FIG. 4 is a schematic cross-sectional view of an internal electrode including a lead-out portion according to the example embodiment of present disclosure, an corresponding to FIG. 3A.

FIG. 4 is a schematic cross-sectional view of an internal electrode including a lead-out portion according to an example embodiment of the disclosure, present corresponding to FIG. 3A.

Figure 5A:
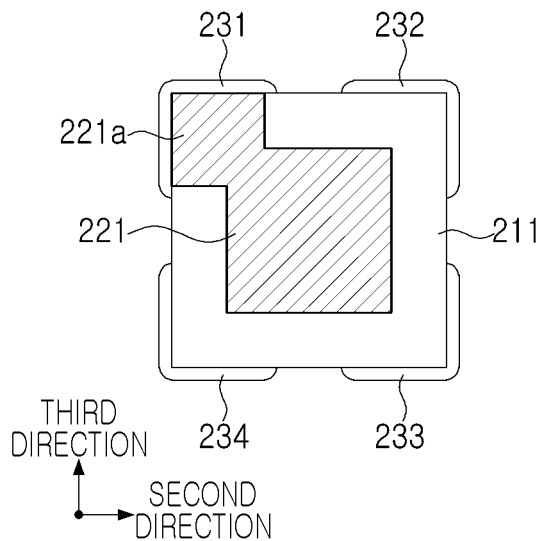
FIGS. 5A to 5C are schematic cross-sectional views of an internal electrode including a lead-out portion according to an example embodiment of the present disclosure.
Figure 5B:
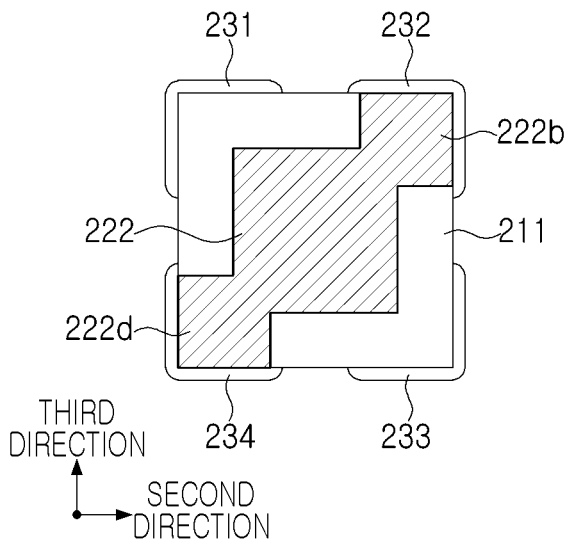
Figure 5C:
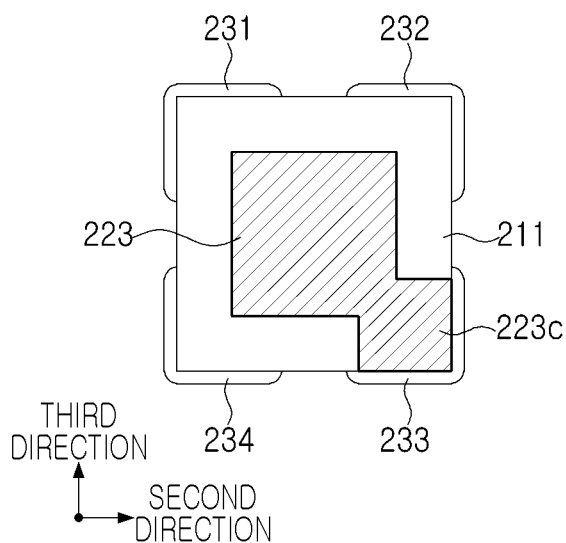

FIGS. 5A to 5C are schematic cross-sectional views of an internal electrode including a lead-out portion according to an example embodiment of the present disclosure.

Figure 6:
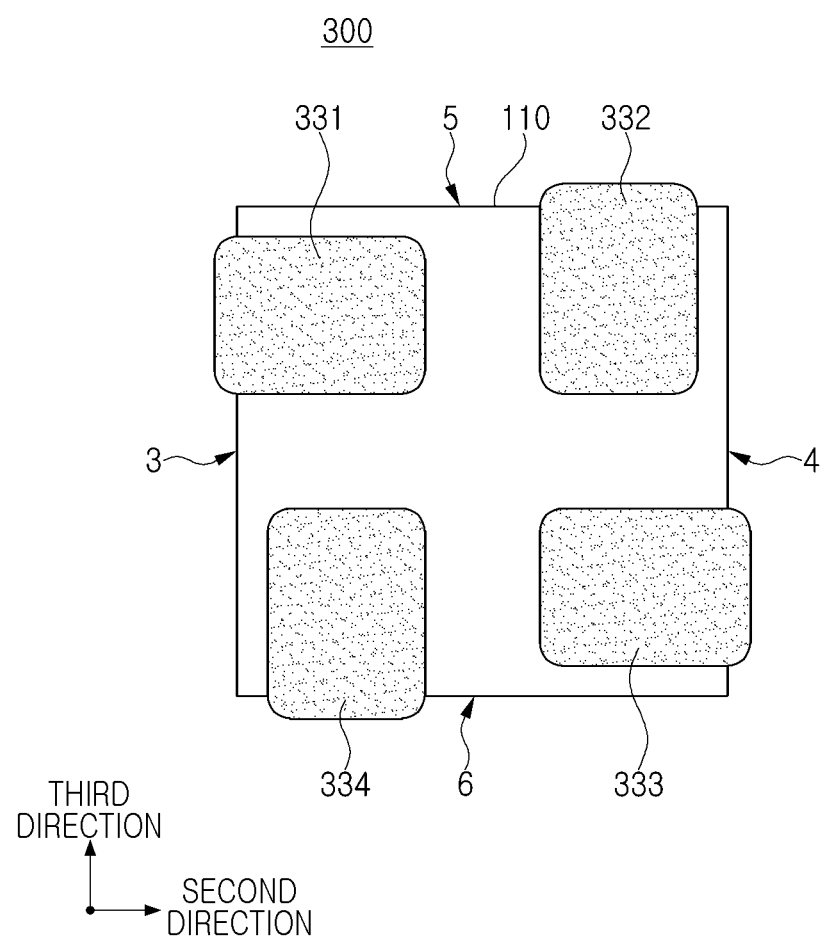
FIG. 6 is a schematic plan view of a multilayer electronic component according to an example embodiment of the present disclosure.
Figure 7A:
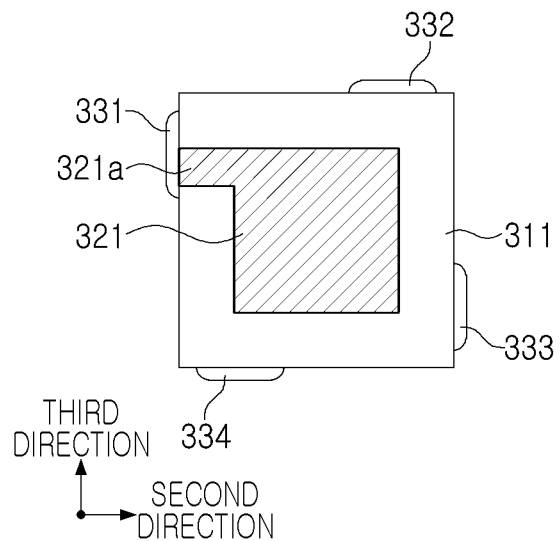
FIGS. 7A to 7D are schematic cross-sectional views of an internal electrode including a lead-out portion according to an example embodiment of the present disclosure.
Figure 7B:
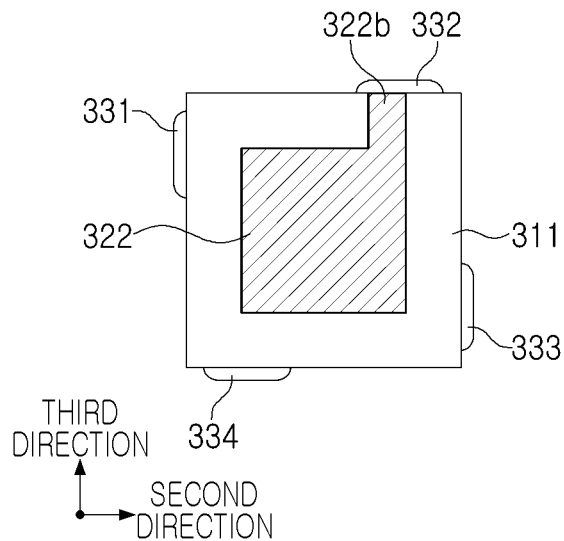
Figure 7C:
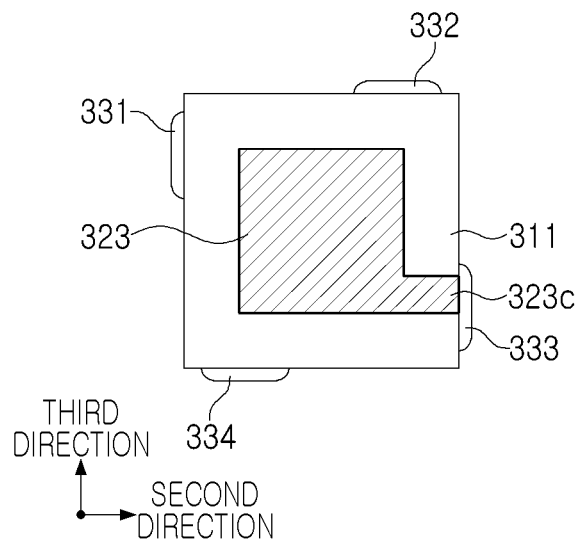
Figure 7D:
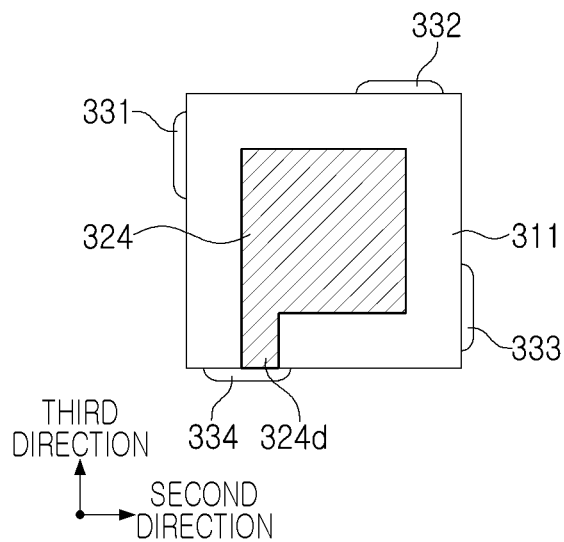

FIG. 6 is a schematic plan view of a multilayer electronic component according to an example embodiment of the present disclosure.

FIGS. 7A to 7D are schematic cross-sectional views of an internal electrode including a lead-out portion according to an example embodiment of the present disclosure.

Figure 8:
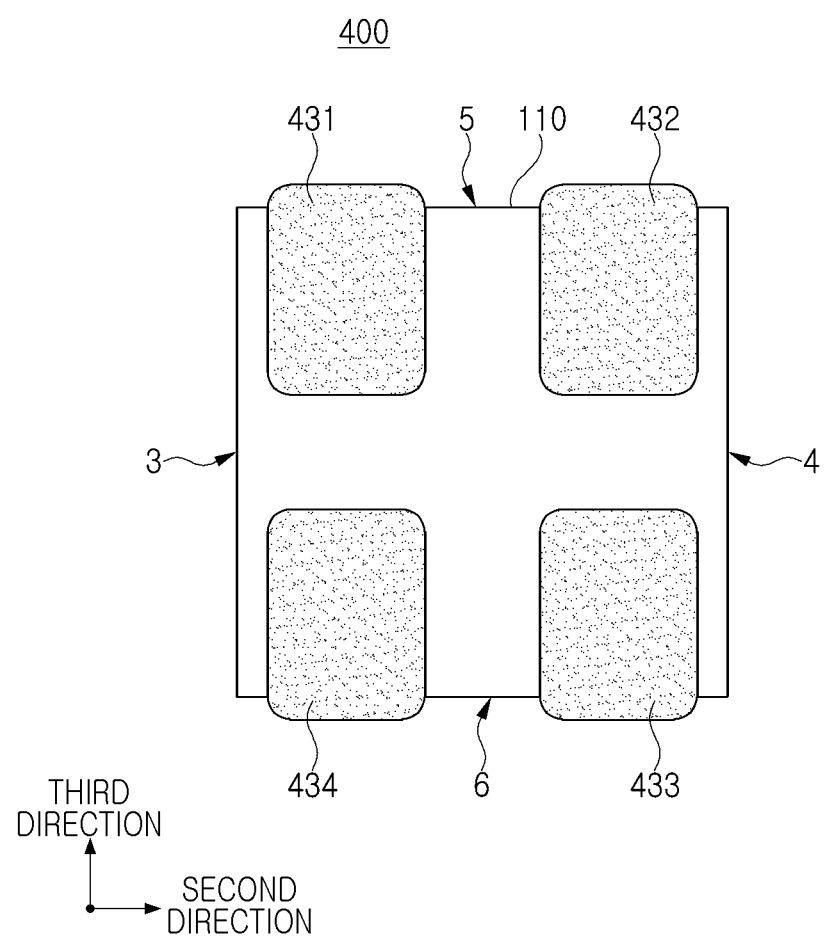
FIG. 8 is a schematic plan view of a multilayer electronic component according to an example embodiment of the present disclosure.
Figure 9A:
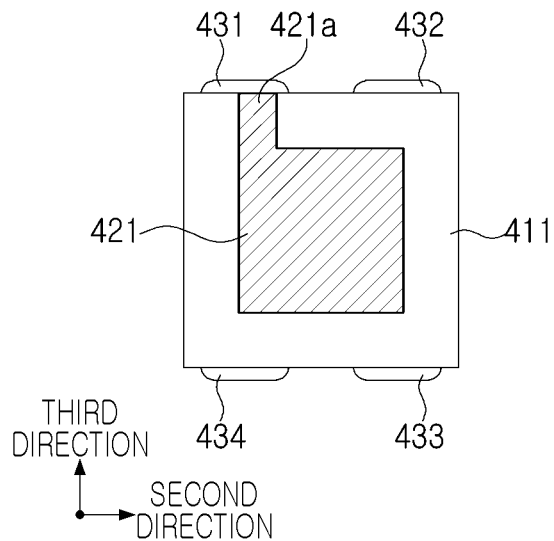
FIGS. 9A to 9D are schematic cross-sectional views of an internal electrode including a lead-out portion according to an example embodiment of the present disclosure.
Figure 9B:
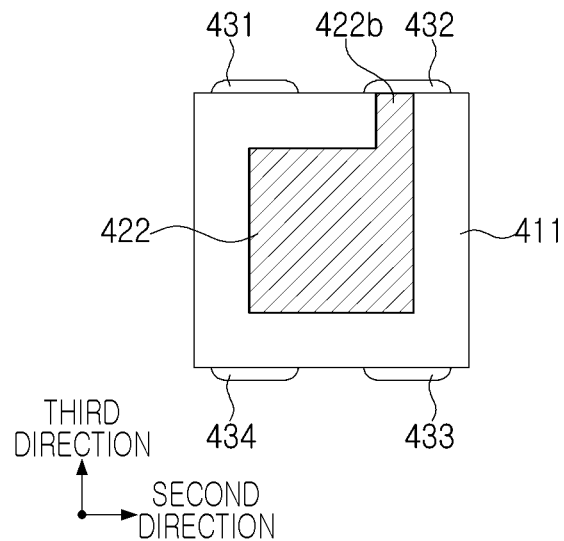
Figure 9C:
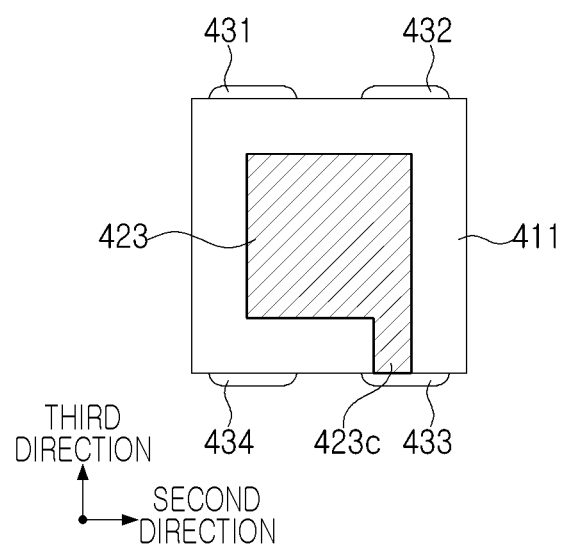
Figure 9D:
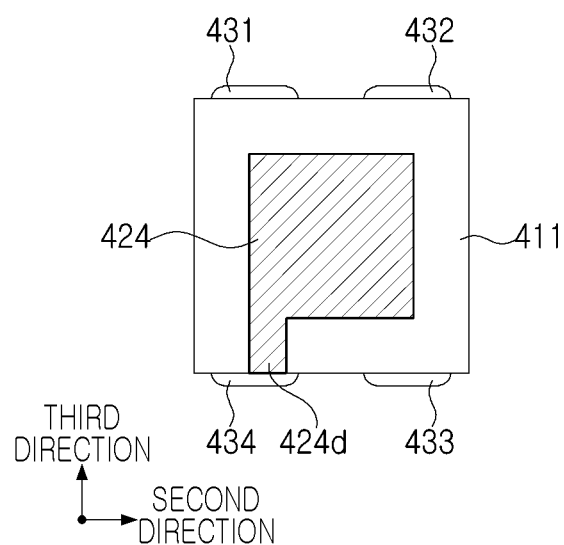

FIG. 8 is a schematic plan view of a multilayer electronic component according to an example embodiment of the present disclosure.

FIGS. 9A to 9D are schematic cross-sectional views of an internal electrode including a lead-out portion according to an example embodiment of the present disclosure.

Hereinafter, a multilayer electronic component according to an example embodiment of the present disclosure will be described in detail with reference to FIGS. 1 to 9D. A multilayer ceramic capacitor is described as an example of a multilayer electronic component. However, the present disclosure may be applied to various electronic products using a dielectric composition, such as inductors, piezoelectric elements, varistors, thermistors, or the like.

A multilayer electronic component 100 according to an example embodiment of the present disclosure may include a body 110 including a dielectric layer 111 and internal electrodes 121 and 122 disposed alternately with the dielectric layer 111 in a first direction, the body 110 having first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction, and external electrodes 131, 132, 133, and 134 disposed on the body 110. The internal electrodes 121, 122, 123, and 124 may be connected to the external electrodes 131, 132, 133, and 134 through lead-out portions 121a, 122b, 123c, and 124d. With respect to cross-sections of the internal electrodes 121, 122, 123, and 124 in the second and third directions, when an average length of each of the lead-out portions 121a, 122b, 123c, and 124d in contact with the external electrodes 131, 132, 133, and 134 is defined as "A" and an average length of each of the external electrodes 131, 132, 133, and 134, connected to the lead-out portions 121a, 122b, 123c, and 124d, in contact with the body 110 is defined as "B," "A/B" may be 0.75 or less (excluding 0). The external electrodes 131, 132, 133, and 134 may include first to fourth external electrodes 131, 132, 133, and 134. The internal electrodes 121, 122, 123, and 124 may include a first internal electrode 121 connected to the first external electrode 131 through a first lead-out portion 121a, a second internal electrode 122 connected to the second external electrode 132 through a second lead-out portion 122b, a third internal electrode 123 connected to the third external electrode 133 through a third lead-out portion 123c, and a fourth internal electrode 124 connected to the fourth external electrode 134 through a fourth lead-out portion 124d.

In the body 110, the dielectric layer 111 and the internal electrodes 121, 122, 123, and 124 may be alternately laminated.

More specifically, the body 110 may include a capacitance formation portion disposed within the body 110, the capacitance formation portion including the first internal electrode 121, the second internal electrode 122, the third internal electrode 123, and the fourth internal electrode 124 in the first direction, with the dielectric layer 111 interposed therebetween, to form capacitance.

Here, the first to fourth internal electrodes 121, 122, 123, and 124 may be defined as a pattern. The first to fourth internal electrodes 121, 122, 123, and 124 may preferably be sequentially disposed in the first direction, but the present disclosure is not particularly limited thereto, and may be arbitrarily disposed in the first direction to form a single pattern.

A specific shape of the body 110 is not particularly limited. However, as illustrated, the body 110 may have a hexahedral shape or a shape similar thereto. During a sintering process, ceramic powder particles included in the body 110 may shrink, such that the body 110 may not have a hexahedral shape having perfectly straight lines, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

A plurality of dielectric layers 111, included in the body 110, may be in a sintered state, and adjacent dielectric layers 111 may be integrated with each other such that boundaries therebetween may not be readily apparent without using a scanning electron microscope (SEM).

A raw material included in the dielectric layer 111 is not limited as long as sufficient capacitance is obtainable therewith. In general, a perovskite ($ABO_3$)-based material may be used. For example, a barium titanate-based material, a lead composite perovskite-based material, or a strontium titanate-based material may be used. The barium titanate-based material may include $BaTiO_3$-based ceramic powder. Examples of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) obtained by partially dissolving Ca or Zr in $BaTiO_3$.

In addition, the raw material included in the dielectric layer 111 may be obtained by adding various ceramic additives, organic solvents, binders, dispersants, and the like to powder particles such as barium titanate ($BaTiO_3$) depending on the purpose of the present disclosure.

A thickness of the dielectric layer 111 is not particularly limited.

In order to more easily achieve high capacitance and miniaturization of the multilayer electronic component, the thickness of the dielectric layer 111 may be 3.0 μm or less, or 1.0 μm or less, preferably 0.6 μm or less, and more preferably 0.4 μm or less.

Here, the thickness of the dielectric layer 111 may refer to a thickness of the dielectric layer 111 disposed between the internal electrodes 121, 122, 123, and 124.

The thickness of the dielectric layer 111 may refer to a size of the dielectric layer 111 in the first direction. In addition, the thickness of the dielectric layer 111 may refer to an average thickness of the dielectric layer 111, and may refer to an average size of the dielectric layer 111 in the first direction.

The average size of the dielectric layer 111 in the first direction may be measured by scanning, with an SEM, an image of a cross-section of the body 110 in the first and second directions at a magnification of 10,000. More specifically, the average size of the dielectric layer 111 in the first direction may refer to an average value of sizes of one dielectric layer 111 in the first direction, measured at ten points, equally spaced apart from each other in the second direction, in the scanned image. The ten equally spaced points may be designated in the capacitance formation portion. In addition, when such average value measurement is performed on ten dielectric layers 111, the average size of the dielectric layer 111 in the first direction may be further generalized.

The internal electrodes 121, 122, 123, and 124 may be disposed alternately with the dielectric layer 111.

The internal electrodes 121, 122, 123, and 124 may include a first internal electrode 121, a second internal electrode 122, a third internal electrode 123, and a fourth internal electrode 124. The first to fourth internal electrodes 121, 122, 123, and 124 may be alternately disposed to oppose each other, with the dielectric layer 111, included in the body 110, interposed therebetween.

The first to fourth internal electrodes 121, 122, 123, and 124 may be electrically isolated from each other by the dielectric layer 111 interposed therebetween in the first direction.

The body 110 may be formed by alternately laminating a ceramic green sheet on which the first internal electrode 121 is printed, a ceramic green sheet on which the second internal electrode 122 is printed, a ceramic green sheet on which the third internal electrode 123 is printed, and a ceramic green sheet on which the fourth internal electrode 124 is printed, and then performing sintering thereon.

A material included in the internal electrodes 121, 122, 123, and 124 is not particularly limited, and a material having excellent electrical conductivity may be used. For example, the internal electrodes 121, 122, 123, and 124 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121, 122, 123, and 124 may be formed by printing, on a ceramic green sheet, an internal electrode conductive paste including at least one of nickel (Ni), copper (Cu), palladium (Pd), silver (Ag), gold (Au), platinum (Pt), tin (Sn), tungsten (W), titanium (Ti), and alloys thereof. A screen-printing method or a gravure-printing method may be used as a method of printing the internal electrode conductive paste, but the present disclosure is not limited thereto.

The external electrodes 131, 132, 133, and 134 may be disposed on the body 110 to be connected to the internal electrodes 121, 122, 123, and 124.

The external electrodes 131, 132, 133, and 134 may include a first external electrode 131, a second external electrode 132, a third external electrode 133, and a fourth external electrode 134, and may be disposed on the body 110 to be spaced apart from each other.

The external electrodes 131, 132, 133, and 134 may be formed of any material having electrical conductivity, such as a metal or the like, and a specific material may be determined in consideration of electrical properties, structural stability, and the like. Furthermore, the external electrodes 131, 132, 133, and 134 may have a multilayer structure.

For example, the external electrodes 131, 132, 133, and 134 may include an electrode layer disposed on the body 110 and a plating layer formed on the electrode layer.

As a more specific example of the electrode layer, the electrode layer may be a sintered electrode including a conductive metal and glass, or a resin-based electrode including a conductive metal and a resin.

In addition, the electrode layer may have a form in which the sintered electrode and the resin-based electrode are sequentially formed on the body 110.

In addition, the electrode layer may be formed by transferring a sheet including a conductive metal onto the body 110 or by transferring a sheet including a conductive metal onto the sintered electrode.

The conductive metal used for the electrode layer is not particularly limited as long as it is a material capable of being electrically connected to the internal electrodes 121, 122, 123, and 124 to form capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof. The electrode layer may be formed by applying a conductive paste prepared by adding a glass frit to the conductive metal powder particles and then sintering thereon.

The plating layer may serve to improve mounting properties.

A type of the plating layer is not particularly limited, and may be a single plating layer including at least one of nickel (Ni), tin (Sn), palladium (Pd), and alloys thereof, and may be formed as a plurality of plating layers.

As a more specific example of the plating layer, the plating layer may be a Ni plating layer or a Sn plating layer, may have a form in which a Ni plating layer and a Sn plating layer are sequentially formed on the electrode layer, and may have a form in which a Sn plating layer, a Ni plating layer, and a Sn plating layer are sequentially formed. In addition, the plating layer may include a plurality of Ni plating layers and/or a plurality of Sn plating layers.

A multilayer electronic component also has been widely used for decoupling that removes noise from electrical signals within a set due to excellent high-frequency (low ESL) properties thereof.

In order to address noise in high-speed integrated circuits (ICs), land surface capacitors (LSCs) may be applied to portions adjacent to the ICs. It is known that an LSC requires low thickness and high-frequency properties. In order to reduce ESL, it is important to minimize the number of magnetic flux linkages per unit current in a high frequency-region. Such an issue has been addressed in various manners, such as controlling the formation and structure in a way that minimizes a current loop, or disposing internal and external electrodes in a way that cancels a magnetic field.

ESL properties may also be important. However, there is also a growing need to improve reliability for stable operation of MLCCs. When exposed to a humid environment, moisture may permeate into an MLCC and cause failures. One of the main moisture permeation pathways is known as a path through which moisture permeates an internal electrode through an interface between an external electrode and a ceramic body. Accordingly, there is a need for research into an MLCC structure capable of achieving low ESL while improving moisture resistance reliability by suppressing the permeation of external moisture.

Accordingly, according to the present disclosure, in a structure capable of achieving low ESL, an internal electrode including a lead-out portion may be included, and a connection interface between an internal electrode and an external electrode capable of achieving an external moisture permeation path at an optimal rate may be designed, thereby improving moisture resistance reliability of a multilayer electronic component.

In an example embodiment of the present disclosure, the internal electrodes 121, 122, 123, and 124 may be connected to the external electrodes 131, 132, 133, and 134 through the lead-out portions 121*a*, 122*b*, 123*c*, and 124*d*, respectively. More specifically, the first internal electrode 121 may be connected to the first external electrode 131 through the first lead-out portion 121*a*, the second internal electrode 122 may be connected to the second external electrode 132 through the second lead-out portion 122*b*, the third internal electrode 123 may be connected to the third external electrode 133 through the third lead-out portion 123*c*, and the fourth internal electrode 124 may be connected to the fourth external electrode 134 through the fourth lead-out portion 124*d*.

More specifically, the first internal electrode 121 may be connected to the first external electrode 131 without being connected to the second to fourth external electrodes 132, 133, and 134, the second internal electrode 122 may be connected to the second external electrode 132 without being connected to the first, third and fourth external electrodes 131, 133 and 134, the third internal electrode 123 may be connected to the third external electrode 133 without being connected to the first, second and fourth external electrodes 131, 132 and 134, and the fourth internal electrode 124 may be connected to the fourth external electrode 134 without being connected to first to third external electrodes 131, 132, and 133.

As the internal electrodes 121, 122, 123, and 124 are respectively connected to the external electrodes 131, 132, 133, and 134 through the lead-out portions 121*a*, 122*b*, 123*c*, and 124*d*, low ESL properties in a high frequency region may be achieved.

In the present disclosure, the internal electrodes 121, 122, 123, and 124 may include the lead-out portions 121*a*, 122*b*, 123*c*, and 124*d* and a main portion excluding the lead-out portions 121*a*, 122*b*, 123*c*, and 124*d*.

More specifically, the first to fourth lead-out portions 121*a*, 122*b*, 123*c*, and 124*d* may be regions in which the first to fourth internal electrodes 121, 122, 123, and 124 do not overlap each other in a first direction. As the first to fourth lead-out portions 121*a*, 122*b*, 123*c*, and 124*d* do not overlap each other in the first direction, capacitance may not be formed.

In addition, the main portion may be a region in which the first to fourth internal electrodes 121, 122, 123, and 124 overlap each other in the first direction. As the main portion overlaps in the first direction, capacitance may be formed, and a corresponding region may be referred to as a capacitance formation portion.

More specifically, the main portion may refer to a first main portion, a region of the first internal electrode 121 excluding the first lead-out portion 121*a*, a second main portion, a region of the second internal electrode 122 excluding the second lead-out portion 122*b*, a third main portion, a region of the third internal electrode 123 excluding the third lead-out portion 123*c*, and a fourth main portion, a region of the fourth internal electrode 124 excluding the fourth lead-out portion 124*d*.

In other words, the internal electrode may include a lead-out portion, a region in which capacitance is not formed, and a main portion, a region in which capacitance is formed.

A shape of the lead-out portion may vary. For example, a first lead-out portion may be in contact with a portion of at least one of the third and fifth surfaces 3 and 5, a second lead-out portion may be in contact with a portion of at least one of the fourth and fifth surfaces 4 and 5, a third lead-out portion may be in contact with a portion of at least one of the fourth and sixth surfaces 4 and 6, and a fourth lead-out portion may be in contact with a portion of at least one of the third and sixth surfaces 3 and 6.

That is, it may be sufficient for the first lead-out portion to be in contact with a portion of at least one of the third and fifth surfaces 3 and 5, and it may not be necessary for the first lead-out portion to be simultaneously in contact with the third and fifth surfaces 3 and 5. Such a description may be applied to the second to fourth lead-out portions in the same manner.

As another example, the first lead-out portion may be disposed across a portion of the third surface 3 and a portion of the fifth surface 5, the second lead-out portion may be disposed across a portion of the fourth surface 4 and a portion of the fifth surface 5, the third lead-out portion may be disposed across a portion of the fourth surface 4 and a portion of the sixth surface 6, and the fourth lead-out portion may be disposed across a portion of the third surface 3 and a portion of the sixth surface 6.

As another example, the second internal electrode may further include a second additional lead-out portion connected to the fourth external electrode, and the fourth internal electrode may further include a fourth additional lead-out portion connected to the second external electrode.

That is, the second internal electrode may be connected to the second external electrode through the second lead-out portion and may be connected to the fourth external electrode through the second additional lead-out portion, and the fourth internal electrode may be connected to the fourth external electrode through the fourth lead-out portion and may be connected to the second external electrode through the fourth additional lead-out portion.

In other words, the first internal electrode may be connected to the first external electrode, the second and fourth internal electrodes may be simultaneously connected to the second external electrode and the fourth external electrode, and the third internal electrode may be connected to the third external electrode.

When the second and fourth internal electrodes are simultaneously connected to the second and fourth external electrodes, each of the lead-out portions included in the second and fourth internal electrodes may have a region in which the second and fourth internal electrodes overlap each other. The second internal electrode and the fourth internal electrode may have substantially the same shape, but the present disclosure is not particularly limited thereto.

When the first to fourth internal electrodes are sequentially disposed, the first internal electrode, the second internal electrode, the third internal electrode, and the fourth internal electrode may be sequentially disposed.

With respect to a cross-section of the internal electrode in second and third directions, an average length of each of the lead-out portions 121a, 122b, 123c, and 124d in contact with the external electrodes 131, 132, 133, and 134 is defined as "A" and an average length of each of the external electrodes 131, 132, 133, and 134, connected to the lead-out portions 121a, 122b, 123c, and 124d, in contact with the body 110 is defined as "B," "A/B" may be 0.75 or less.

A lower limit of "A/B" is not particularly limited for moisture resistance reliability. However, for connectivity between the internal and external electrodes, it may be sufficient for the lower limit of "A/B" to be 0.1 or more, or 0.2 or more, preferably 0.3 or more, and more preferably 0.4 or more.

Here, "A" may refer to an average value of a length of the lead-out portion in contact with the external electrode.

Referring to FIG. 4 illustrating a cross-section of one of a plurality of internal electrodes in second and third directions, the first lead-out portion 121a may be connected to the first external electrode 131. When a length in the third direction is defined as "Aa1" and a length in the second direction is defined as "Aa2," among directions of the first lead-out portion 121a in contact with the first external electrode 131, an average length of "Aa1" and "Aa2" may be defined as "A1," which may be referred to as "A."

"B" may refer to an average value of lengths of external electrodes in contact with bodies of external electrodes in contact with a lead-out portion.

"An external electrode connected to a lead-out portion" may refer to a first external electrode 131, when the first internal electrode 121 is connected to the first external electrode 131 and is not connected to the second to fourth external electrodes 132, 133, and 134 through the first lead-out portion 121a.

In this case, when a length in the third direction of a size of the first external electrode 131 in contact with the body 110 is defined as "Ba1" and a length in the second direction of the size of the first external electrode 131 in contact with the body 110 is defined as "Ba2," an average length of "Ba1" and "Ba2" may be defined as "B1," which may be referred to as "B."

A method of calculating "A" and "B" may be applied to an internal electrode including a plurality of lead-out portions to be described below in the same manner.

When "A/B" is 0.75 or less, permeation of external moisture into an interface between a body and an external electrode may be suppressed, such that moisture resistance reliability may be excellent.

When "A/B" is greater than 0.75, external moisture may easily permeate into the interface between the body and the external electrode, such that moisture resistance reliability may be degraded.

A method of measuring "A" and "B" is not particularly limited. For example, "A" and "B" may be measured using an optical microscope (OM), an SEM, and a transmission electron microscope (TEM). Other methods and/or tools appreciated by one of ordinary skill in the art, even if not described in the present disclosure, may also be used.

More specifically, "A" may be obtained by verifying, in an arbitrary first direction, a cross-section of a multilayer electronic component in the second and third directions and measuring a length of a lead-out portion in contact with an external electrode, and "B" may be obtained by measuring a length of the external electrode in contact of a surface of a body in the same cross-section.

As another measurement method, "B" may be obtained by measuring a length of an external electrode of a multilayer electronic component in contact with a body of the multilayer electronic component and calculating an average thereof, and "A" may be obtained by removing the external electrode 131, 132, 133, and 134, measuring a length of a lead-out portion 121a, 122b, 123c, and 124d in contact with respective surfaces, and calculating an average thereof.

The external electrodes 131, 132, 133, and 134 may be in contact with the lead-out portions 121a, 122b, 123c, and 124d, and may be disposed to cover the lead-out portions 121a, 122b, 123c, and 124d.

Here, "disposed to cover" means that the external electrodes 131, 132, 133, 134 are disposed such that the lead-out portions 121a, 122b, 123c, and 124d in contact with at least one surface of the body 110 have no portion externally exposed.

More specifically, the first external electrode 131 may be in contact with the first lead-out portion 121a and may be disposed to cover the first lead-out portion 121a, the second external electrode 132 may be in contact with the second lead-out portion 122b and may be disposed to cover the second lead-out portion 122b, the third external electrode 133 may be in contact with the third lead-out portion 123c and may be disposed to cover the third lead-out portion 123c, and the fourth external electrode 134 may be in contact with the fourth lead-out portion 124d and may be disposed to cover the fourth lead-out portion 124d.

It may be sufficient for the first to fourth external electrodes 131, 132, 133, and 134 to be disposed on at least one of the third to sixth surfaces 3, 4, 5, and 6 of the body. However, for ease of being mounted on a board and more excellent moisture resistance reliability, the first to fourth external electrodes 131, 132, 133, and 134 may be preferably disposed to extend to a portion of the first surface 1 and a portion of the second surface 2 of the body 110.

The first to fourth external electrodes 131, 132, 133, and 134 may be disposed to be spaced apart from each other. Thus, the first to fourth external electrodes 131, 132, 133, and 134 may be connected to different voltages, and accordingly may have two or more different voltages or three or more different voltages. In this case, one of the different voltages may be in a grounded state. As a result, there may be advantages of allowing a signal terminal and a ground terminal to be distinguished from each other for each terminal of an external electrode, and being applicable to various circuits.

For example, the first to fourth external electrodes 131, 132, 133, and 134 may have at least one voltage being in a grounded state, the at least one voltage having a potential difference different from the grounded state. More specifically, the first external electrode 131 and the third external electrode 131 may have the same voltage instead of being grounded, and the second external electrode 132 and the fourth external electrode 134 may be in a grounded state. Alternatively, the first external electrode 131 may have a voltage instead of being grounded, the third external electrode 133 may have a voltage having a potential difference different from the first external electrode 131 instead of being grounded, and the second external electrode 132 and the fourth external electrode 134 may be in a grounded state. However, the present disclosure is not particularly limited thereto, and a user may design an electrode state having various options.

A size of the multilayer electronic component 100 is not particularly limited.

However, in order to simultaneously achieve miniaturization and high capacitance, a dielectric layer and an internal electrode may need to have a reduced thickness to increase the number of laminations. Thus, the multilayer electronic component 100 having a size of 1005 (length×width: 1.0 mm×0.5 mm) or less may have a more significant effect according to the present disclosure.

In addition, in order to simultaneously achieve a low ESL reduction effect and a moisture resistance reliability improvement effect in a high-frequency range, the multilayer electronic component 100 having the same length and width, such as a size of 0606 (length×width: 0.6 mm×0.6 mm) or less, may have a more significant effect according to the present disclosure.

Hereinafter, the present disclosure will be described in more detail through various example embodiments of a multilayer electronic component. The example embodiments are provided to assist in an understanding of the disclosure, and thus the present disclosure is not limited by the example embodiments. In addition, it would be obvious to those skilled in the art that multilayer electronic components according to various example embodiments may be mounted on a board.

First Example Embodiment

Referring to FIGS. 1 to 3 to describe a multilayer electronic component 100 according to a first example embodiment of the present disclosure, a first internal electrode 121 may be connected to a first external electrode 131 disposed to cover a first lead-out portion 121a across a portion of a third surface 3 and a portion of a fifth surface 5 through the first lead-out portion 121a disposed to be in contact therewith across the portion of the third surface 3 and the portion of the fifth surface 5. A second internal electrode 122 may be connected to a second external electrode 131 disposed to cover a second lead-out portion 122b across a portion of a fourth surface 4 and a portion of the fifth surface 5 through the second lead-out portion 122b disposed to be in contact therewith across the portion of the fourth surface 4 and the portion of the fifth surface 5. A third internal electrode 123 may be connected to a third external electrode 133 disposed to cover a third lead-out portion 123c across a portion of the fourth surface 4 and a portion of a sixth surface 6 through the third lead-out portion 123c disposed to be in contact therewith across the portion of the fourth surface 4 and the portion of the sixth surface 6. A fourth internal electrode 124 may be connected to a fourth external electrode 134 disposed to cover a fourth lead-out portion 124d across a portion of the third surface 3 and a portion of the sixth surface 6 through the fourth lead-out portion 124d disposed to be in contact therewith across the portion of the third surface 3 and the portion of the sixth surface 6.

Second Example Embodiment

Referring to FIGS. 5A to 5C to describe a multilayer electronic component 200 according to a second example embodiment of the present disclosure, the multilayer electronic component 200 may be different from the multilayer electronic component 100 according to the first example embodiment in terms of a second internal electrode 222 and a fourth internal electrode (not illustrated), but may be the same as the multilayer electronic component 100 according to the first example embodiment in terms of other components. The second internal electrode 222 and the fourth internal electrode (not illustrated) will be described in detail.

A second internal electrode 222 may connected to a second external electrode 231 disposed to cover a second lead-out portion 222b across a portion of a fourth surface 4 and a portion of a fifth surface 5 through the second lead-out portion 222b disposed to be in contact therewith across the portion of the fourth surface 4 and the portion of the fifth surface 5. In addition, the second internal electrode 222 may be connected to a fourth external electrode 234 disposed to cover a second additional lead-out portion 222d across a portion of a third surface 3 and a portion of a sixth surface 6 through the second lead-out portion 222b disposed to be in contact therewith across the portion of the third surface 3 and the portion of the sixth surface 6. Accordingly, the second internal electrode 222 may be simultaneously connected to the second external electrode 232 and the fourth external electrode 234.

Although not illustrated in the drawings, a fourth internal electrode may have a shape the same as that of a second internal electrode. Accordingly, when first to fourth internal electrodes are sequentially disposed, the first to fourth internal electrodes may be laminated and disposed in a first direction in an order of a first internal electrode 221, a second internal electrode 222, a third internal electrode 223, a second internal electrode 222, a first internal electrode 221, and so on.

Third Example Embodiment

Referring to FIGS. 6 and 7A to 7D to describe a multilayer electronic component 300 according to a third example embodiment of the present disclosure, a first internal electrode 321 may be connected to a first external electrode 331 disposed to cover a first lead-out portion 321a on a portion of a third surface 3 through the first lead-out portion 321a in contact with the portion of the third surface 3. A second internal electrode 322 may be connected to a second external electrode 332 disposed to cover a second lead-out portion 322b on a portion of a fifth surface 5 through the second lead-out portion 322b in contact with the portion of the fifth surface 5. A third internal electrode 323 may be connected to a third external electrode 333 disposed to cover a third lead-out portion 323c on a portion of a fourth surface 4 through the third lead-out portion 323c in contact with the portion of the fourth surface 4. A fourth internal electrode 324 may be connected to a fourth external electrode 334 disposed to cover a fourth lead-out portion 324d on a portion of a sixth surface 6 through the fourth lead-out portion 324d in contact with the portion of the sixth surface 6.

Four Example Embodiment 4

Referring to FIGS. 8 and 9A to 9D to describe a multilayer electronic component 400 according to a fourth example embodiment of the present disclosure, a first internal electrode 421 may be connected to a first external electrode 431 disposed to cover a first lead-out portion 421a on a portion of a fifth surface 5 through the first lead-out portion 421a in contact with the portion of the fifth surface 5. A second internal electrode 422 may be connected to a second external electrode 432 disposed to cover a second lead-out portion 422b on a portion of the fifth surface 5 through the second lead-out portion 422b in contact with the portion of the fifth surface 5. A third internal electrode 423 may be connected to a third external electrode 433 disposed to cover a third lead-out portion 423c on a portion of a sixth surface 6 through the third lead-out portion 423c in contact with the portion of the sixth surface 6. A fourth internal electrode 424 may be connected to a fourth external electrode 434 disposed to cover a fourth lead-out portion 424d on a portion of the sixth surface 6 through the fourth lead-out portion 424d in contact with the portion of the sixth surface 6.

Board Having Multilayer Electronic Component Mounted Thereon

Figure 10:
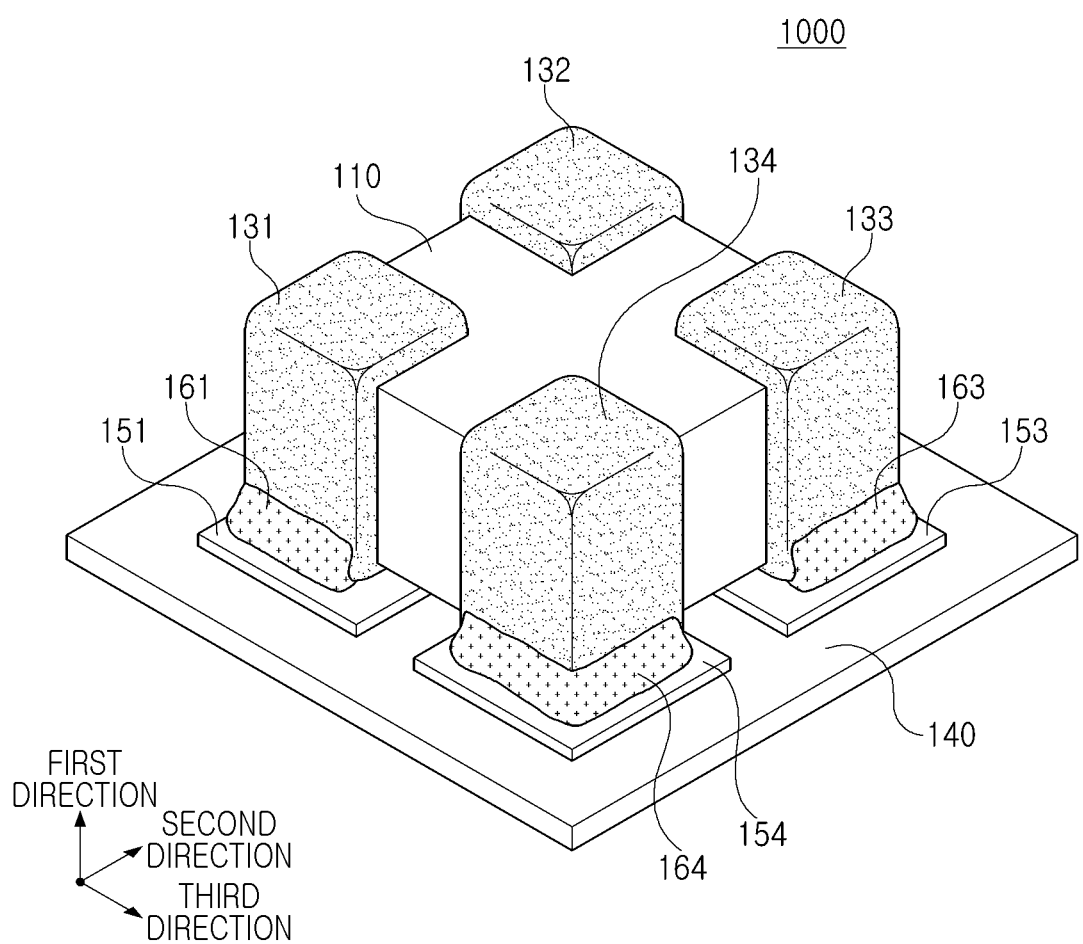
FIG. 10 is a schematic perspective view of a board having a multilayer electronic component mounted thereon.

FIG. 10 is a schematic perspective view of a board having a multilayer electronic component mounted thereon.

Hereinafter, with reference to FIG. 10, a board having a multilayer electronic component mounted thereon according to another example embodiment of the present disclosure will be described in detail. Descriptions overlapping the above descriptions of the multilayer electronic components will be omitted.

A board having a multilayer electronic component mounted thereon, the board 1000 according to another example embodiment of the present disclosure may include a printed circuit board 140 including electrode pads 151, 152, 153, and 154, the multilayer electronic component 100 installed on the printed circuit board 140, and solders 161, 162, 163, and 164 connecting the electrode pads 151, 152, 153, and 154 and the multilayer electronic component 100 to each other. The electrode pads may include first to fourth electrode pads 151, 152, 153, and 154, and the solders may include first to fourth solders 161, 162, 163, and 164. First to fourth external electrodes 131, 132, 133, and 134 of the multilayer electronic component and the first to fourth electrode pads 151, 152, 153, and 154 may be respectively connected to each other by the first to fourth solders 161, 162, 163, and 164.

In this case, the first to fourth external electrodes 131, 132, 133, and 134 may have two or more different voltages or three or more different voltages, as described above. In this case, one of the different voltages may be in a grounded state.

A user may design an electrode state having various options through external electrodes having various voltages.

(Test Examples)

Hereinafter, test examples in which reliability is not degraded due to permeation of external moisture or a plating solution by controlling the number of internal electrode lead-out portions will be described.

100 sample chips were manufactured for each test example, and a size of a sample chip was 0.6 mm×0.6 mm×0.1 mm (length (L)×width (W)×thickness (T)). Moisture resistance reliability evaluation was conducted on each test example.

Test Example 1 was manufactured by repeatedly laminating two internal electrodes having two different diagonally opposite lead-out portions in a single pattern.

More specifically, one internal electrode may be connected to a first external electrode through a lead-out portion in contact with a portion of a third surface and a portion of a fifth surface, and may be connected to a third external electrode through an additional lead-out portion in contact with a portion of a fourth surface and a portion of a sixth surface. Another internal electrode may be connected to a second external electrode through a lead-out portion in contact with a portion of the fourth surface and a portion of the fifth surface, and may be connected to a fourth external electrode through an additional lead-out portion in contact with a portion of the third surface and a portion of the sixth surface.

Test Example 2 was manufactured by repeatedly laminating four internal electrodes having one lead-out portion, disposed on different diagonals, in a single pattern.

More specifically, one internal electrode may be connected to a first external electrode through a lead-out portion in contact with a portion of a third surface and a portion of a fifth surface, another internal electrode may be connected to a second external electrode through a lead-out portion in contact with a portion of a fourth surface and a portion of the fifth surface, another internal electrode may be connected to a third external electrode through a lead-out portion in contact with a portion of the fourth surface and a portion of a sixth surface, and a last internal electrode may be connected to a fourth external electrode through a lead-out portion in contact with a portion of the third surface and a portion of the sixth surface.

Test Example 3 was manufactured by repeatedly laminating one internal electrode having one lead-out portion, one internal electrode having two lead-out portions, one internal electrode having one lead-out portion, and one internal electrode having two lead-out portions in a single pattern.

More specifically, one internal electrode may be connected to a first external electrode through a lead-out portion in contact with a portion of a third surface and a portion of a fifth surface. Another internal electrode may be connected to a second external electrode through a lead-out portion in contact with a portion of a fourth surface and a portion of the fifth surface, and may be connected to a fourth external electrode through an additional lead-out portion in contact with a portion of the third surface and a portion of a sixth surface. Another internal electrode may be connected to a third external electrode through a lead-out portion in contact with a portion of the fourth surface and a portion of the sixth surface. In the same manner as the second internal electrode, a last internal electrode may be connected to the second external electrode through the lead-out portion in contact with the portion of the fourth surface and the portion of the fifth surface, and may be connected to the fourth external electrode through the additional lead-out portion in contact with the portion of the third surface and the portion of the sixth surface.

For a moisture resistance reliability evaluation, a voltage condition of 1.0 Vr was applied for 1 hour at a temperature condition of 85° C. and a relative humidity condition of 85%. A test example in which at least one of ten chips is defective was marked with "X" and a test example having no defective chip was marked with "O."

TABLE 1

| Test No. | L(μm) | W(μm) | T(μm) | W/L | A(μm) | B(μm) | A/B | Moisture resistance reliability evaluation |
|---|---|---|---|---|---|---|---|---|
| Test Example 1-1 | 630.71 | 612.75 | 99.36 | 0.97 | 198.87 | 449.76 | 0.442 | O |
| Test Example 1-2 | 640.18 | 638.77 | 95.55 | 1.00 | 222.52 | 453.17 | 0.491 | O |
| Test Example 1-3 | 678.78 | 655.77 | 98.44 | 0.97 | 243.72 | 453.45 | 0.537 | O |
| Test Example 1-4 | 629.53 | 634.72 | 95.69 | 1.01 | 263.86 | 458.00 | 0.576 | O |
| Test Example 1-5 | 629.77 | 614.75 | 96.55 | 0.98 | 278.64 | 456.93 | 0.610 | O |
| Test Example 1-6 | 662.33 | 617.45 | 97.41 | 0.93 | 299.34 | 451.35 | 0.663 | O |
| Test Example 1-7 | 646.38 | 625.12 | 97.24 | 0.97 | 319.87 | 455.50 | 0.702 | X |
| Test Example 1-8 | 670.01 | 612.11 | 94.82 | 0.91 | 340.17 | 454.62 | 0.748 | X |
| Test Example 1-9 | 674.42 | 619.48 | 92.81 | 0.92 | 362.48 | 455.63 | 0.796 | X |
| Test Example 1-10 | 688.24 | 652.01 | 95.08 | 0.95 | 382.82 | 451.73 | 0.847 | X |

TABLE 2

| Test No. | L(μm) | W(μm) | T(μm) | W/L | A(μm) | B(μm) | A/B | Moisture resistance reliability evaluation |
|---|---|---|---|---|---|---|---|---|
| Test Example 2-1 | 634.24 | 665.32 | 92.74 | 1.05 | 200.34 | 454.53 | 0.441 | O |
| Test Example 2-2 | 662.53 | 683.18 | 93.27 | 1.03 | 219.34 | 456.35 | 0.481 | O |
| Test Example 2-3 | 681.63 | 620.86 | 92.49 | 0.91 | 239.93 | 450.43 | 0.533 | O |
| Test Example 2-4 | 619.15 | 671.13 | 94.03 | 1.08 | 259.11 | 457.94 | 0.566 | O |
| Test Example 2-5 | 658.87 | 626.00 | 92.69 | 0.95 | 281.83 | 450.64 | 0.625 | O |

TABLE 2-continued

| Test No. | L(μm) | W(μm) | T(μm) | W/L | A(μm) | B(μm) | A/B | Moisture resistance reliability evaluation |
|---|---|---|---|---|---|---|---|---|
| Test Example 2-6 | 669.29 | 683.00 | 91.99 | 1.02 | 298.57 | 450.80 | 0.662 | ○ |
| Test Example 2-7 | 670.37 | 649.77 | 95.32 | 0.97 | 322.30 | 451.45 | 0.714 | ○ |
| Test Example 2-8 | 644.39 | 655.58 | 99.63 | 1.02 | 338.22 | 453.56 | 0.746 | ○ |
| Test Example 2-9 | 662.96 | 653.66 | 94.04 | 0.99 | 359.31 | 453.56 | 0.792 | X |
| Test Example 2-10 | 626.86 | 648.94 | 96.97 | 1.04 | 382.12 | 451.28 | 0.847 | X |

TABLE 3

| Test No. | L(μm) | W(μm) | T(μm) | W/L | A(μm) | B(μm) | A/B | Moisture resistance reliability evaluation |
|---|---|---|---|---|---|---|---|---|
| Test Example 3-1 | 658.11 | 654.78 | 97.11 | 0.99 | 202.87 | 457.73 | 0.443 | ○ |
| Test Example 3-2 | 677.53 | 664.69 | 96.29 | 0.98 | 222.19 | 457.41 | 0.486 | ○ |
| Test Example 3-3 | 623.00 | 663.27 | 97.46 | 1.06 | 242.64 | 456.00 | 0.532 | ○ |
| Test Example 3-4 | 670.66 | 659.26 | 99.08 | 0.98 | 259.97 | 455.02 | 0.571 | ○ |
| Test Example 3-5 | 679.68 | 640.37 | 99.62 | 0.94 | 280.99 | 455.18 | 0.617 | ○ |
| Test Example 3-6 | 651.53 | 652.68 | 91.39 | 1.00 | 299.20 | 451.01 | 0.663 | ○ |
| Test Example 3-7 | 670.08 | 628.71 | 90.46 | 0.94 | 320.46 | 457.38 | 0.701 | ○ |
| Test Example 3-8 | 626.45 | 628.38 | 91.49 | 1.00 | 341.24 | 452.22 | 0.755 | X |
| Test Example 3-9 | 682.23 | 659.58 | 97.50 | 0.97 | 358.41 | 454.38 | 0.789 | X |
| Test Example 3-10 | 670.88 | 619.25 | 94.92 | 0.92 | 380.79 | 453.14 | 0.840 | X |

Test Example 1 had two internal electrodes including two different diagonally opposite lead-out portions, passed a moisture resistance reliability evaluation when "A/B" has a value of 0.663, and did not pass the moisture resistance reliability evaluation when "A/B" has a value of 0.702. From such a result, it can be seen that a surface (interface) of a lead-out portion in contact with an external electrode needs to have a relatively small area in order to have excellent moisture resistance reliability when internal electrodes including only two lead-out portions are repeatedly laminated.

Conversely, Test Example 2 had first to fourth internal electrodes including one lead-out portion, different from each other, and passed a moisture resistance reliability evaluation even when "A/B" has a value of 0.746. From such a result, it can be seen that a surface (interface) of a lead-out portion in contact with an external electrode has a relatively large internal electrodes including only one lead-out portion are repeatedly laminated.

In addition, Test Example 3 had a pattern including two internal electrodes including one lead-out portion, different from each other, and one internal electrode including two lead-out portions, and passed a moisture resistance reliability evaluation even when "A/B" has a value of 0.701. From such a result, it can be seen that a surface (interface) of a lead-out portion in contact with an external electrode has a relatively large area when internal electrodes including one lead-out portion and two lead-out portions are repeatedly laminated in a single pattern.

From Test Examples 1 to 3, it can be seen that an internal electrode including only two lead-out portions has excellent moisture resistance reliability when an interface between a lead-out portion and an external electrode has a relatively small area, whereas an internal electrode including one lead-out portion has excellent moisture resistance reliability even when an interface between a lead-out portion and an external electrode has a relatively large area.

While example embodiments have been shown and described above, it will be apparent to those skilled in the art that modifications and variations could be made without departing from the scope of the present disclosure as defined by the appended claims.

In addition, the term "an example embodiment" used herein does not refer to the same example embodiment, and is provided to emphasize a particular feature or characteristic different from that of another example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

The terms used herein is for the purpose of describing particular example embodiments only and is not to be limiting of the example embodiments. As used herein, the singular forms "a," "an," and "the" are intended to include the plural forms as well, unless the context clearly indicates otherwise.

What is claimed is:

1. A multilayer electronic component comprising:
    a body including a dielectric layer and an internal electrode disposed alternately with the dielectric layer in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction; and
    an external electrode disposed on the body, the external electrode including first to fourth external electrodes,
    wherein the internal electrode includes:
        a first internal electrode including a first lead-out portion through which the first internal electrode is connected to the first external electrode,
        a second internal electrode including a second lead-out portion through which the second internal electrode is connected to the second external electrode,
        a third internal electrode including a third lead-out portion through which the third internal electrode is connected to the third external electrode, and
        a fourth internal electrode including a fourth lead-out portion through which the fourth internal electrode is connected to the fourth external electrode,
    wherein with respect to a cross-section of the internal electrode in the second and third directions, when an average length of the first, second, third or fourth lead-out portion in contact with the first, second, third or fourth external electrode, respectively, is defined as "A" and an average length of the first, second, third or fourth external electrode connected to the first, second, third or fourth lead-out portion, respectively, and in contact with the body is defined as "B," "A/B" is 0.75 or less, and
    wherein at least one of the first internal electrode, the second internal electrode, the third internal electrode or the fourth internal electrode is electrically isolated from each of the first internal electrode, the second internal electrode, the third internal electrode and the fourth internal electrode other than the at least one of the first internal electrode, the second internal electrode, the third internal electrode or the fourth internal electrode.

2. The multilayer electronic component of claim 1, wherein
    the second internal electrode further includes a second additional lead-out portion connected to the fourth external electrode, and
    the fourth internal electrode further includes a fourth additional lead-out portion connected to the second external electrode.

3. The multilayer electronic component of claim 1, wherein
    the first lead-out portion is in contact with a portion of at least one of the third and fifth surfaces,
    the second lead-out portion is in contact with a portion of at least one of the fourth and fifth surfaces,
    the third lead-out portion is in contact with a portion of at least one of the fourth and sixth surfaces, and
    the fourth lead-out portion is in contact with a portion of at least one of the third and sixth surfaces.

4. The multilayer electronic component of claim 3, wherein
    the first lead-out portion is disposed across a portion of the third surface and a portion of the fifth surface,
    the second lead-out portion is disposed across a portion of the fourth surface and a portion of the fifth surface,
    the third lead-out portion is disposed across a portion of the fourth surface and a portion of the sixth surface, and
    the fourth lead-out portion is disposed across a portion of the third surface and a portion of the sixth surface.

5. The multilayer electronic component of claim 3, wherein
    the first lead-out portion is in contact with a portion of the third surface and not the fifth surface,
    the second lead-out portion is in contact with a portion of the fifth surface and not the third surface,
    the third lead-out portion is in contact with a portion of the fourth surface and not the sixth surface, and
    the fourth lead-out portion is in contact with a portion of the sixth surface and not the third surface.

6. The multilayer electronic component of claim 5, wherein
    the first external electrode is disposed on a portion of the third surface and not the fifth surface,
    the second external electrode is disposed on a portion of the fifth surface and not the third surface,
    the third external electrode is disposed on a portion of the fourth surface and not the sixth surface, and
    the fourth external electrode is disposed on a portion of the sixth surface and not the third surface.

7. The multilayer electronic component of claim 3, wherein
    the first lead-out portion and the second lead-out portion are in contact with a portion of the fifth surface and neither the third surface nor the fourth surface, and
    the third lead-out portion and the fourth lead-out portion are in contact with the sixth surface and neither the third surface nor the fourth surface.

8. The multilayer electronic component of claim 7, wherein the first external electrode and the second external electrode are disposed on a portion of the fifth surface, and
the third external electrode and the fourth external electrode are disposed on a portion of the sixth surface.

9. The multilayer electronic component of claim 1, wherein the first to fourth lead-out portions are disposed in a region in which the first to fourth internal electrodes do not overlap each other in the first direction.

10. The multilayer electronic component of claim 9, wherein
the first internal electrode further includes a first main portion excluding the first lead-out portion,
the second internal electrode further includes a second main portion excluding the second lead-out portion,
the third internal electrode further includes a third main portion excluding the third lead-out portion,
the fourth internal electrode further includes a fourth main portion excluding the fourth lead-out portion, and
the first to fourth main portions overlap each other in the first direction.

11. The multilayer electronic component of claim 1, wherein the first to fourth internal electrodes are sequentially disposed in the first direction.

12. The multilayer electronic component of claim 1, wherein
the first external electrode is in contact with the first lead-out portion and is disposed to cover the first lead-out portion,
the second external electrode is in contact with the second lead-out portion and is disposed to cover the second lead-out portion,
the third external electrode is in contact with the third lead-out portion and is disposed to cover the third lead-out portion, and
the fourth external electrode is in contact with the fourth lead-out portion and is disposed to cover the fourth lead-out portion.

13. The multilayer electronic component of claim 1, wherein the first to fourth external electrodes are disposed to extend to a portion of the first surface and a portion of the second surface, respectively.

14. The multilayer electronic component of claim 1, wherein the first to fourth external electrodes are disposed to be spaced apart from each other.

15. A board having a multilayer electronic component mounted thereon, the board comprising:
a printed circuit board including an electrode pad including first to fourth electrode pads;
the multilayer electronic component of claim 1 installed on the printed circuit board; and
a solder connecting the electrode pad and the multilayer electronic component to each other, the solder includes first to fourth solders,
wherein the first to fourth external electrodes of the multilayer electronic component and the first to fourth electrode pads are connected to each other by the first to fourth solders, respectively.

16. The board of claim 15, wherein the first to fourth external electrodes have two or more different voltages.

17. The board of claim 16, wherein the first to fourth external electrodes have three or more different voltages.

18. The board of claim 16, wherein one of the different voltages is in a grounded state.

* * * * *